(12) United States Patent
Harper et al.

(10) Patent No.: US 11,777,194 B2
(45) Date of Patent: Oct. 3, 2023

(54) COIL-DRIVEN NEAR FIELD COMMUNICATIONS ANTENNA

(71) Applicant: Microsoft Technology Licensing, LLC, Redmond, WA (US)

(72) Inventors: Marc Harper, Snohomish, WA (US); Apoorva Sharma, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 17/355,616

(22) Filed: Jun. 23, 2021

(65) Prior Publication Data

US 2022/0416405 A1    Dec. 29, 2022

(51) Int. Cl.
*H01Q 1/24*    (2006.01)
*H01Q 7/00*    (2006.01)
*H04W 4/80*    (2018.01)

(52) U.S. Cl.
CPC ............... *H01Q 1/243* (2013.01); *H01Q 7/00* (2013.01); *H04W 4/80* (2018.02)

(58) Field of Classification Search
CPC ............ H01Q 1/24; H01Q 7/00; H01Q 5/335; H01Q 9/42; H04W 4/80; H04B 5/00; H04B 5/0025; H04B 5/0081
See application file for complete search history.

(56) References Cited

U.S. PATENT DOCUMENTS

| | | | |
|---|---|---|---|
| 2012/0071090 A1* | 3/2012 | Charrat | G06K 19/07771 235/492 |
| 2013/0335284 A1* | 12/2013 | Hsu | H02J 50/20 343/788 |
| 2014/0266928 A1 | 9/2014 | Gummalla | |
| 2018/0145398 A1* | 5/2018 | Lilja | H01Q 5/364 |
| 2018/0331416 A1* | 11/2018 | Yu | H01Q 5/314 |

FOREIGN PATENT DOCUMENTS

| | | | |
|---|---|---|---|
| CN | 110994135 A | * 4/2020 | ........... H01Q 1/2216 |
| CN | 110994135 A | 4/2020 | |
| EP | 3579439 A1 | 12/2019 | |

OTHER PUBLICATIONS

"International Search Report and Written Opinion Issued in PCT Application No. PCT/US22/029504", dated Aug. 31, 2022, 12 Pages.

* cited by examiner

*Primary Examiner* — Thai Pham
(74) *Attorney, Agent, or Firm* — Holzer Patel Drennan

(57) ABSTRACT

A communication device includes a conductive chassis, an electrical feed positioned within the conductive chassis and configured to supply a communication signal, an edge antenna at least partially formed in the conductive chassis at an edge of the communication device, and a conductive coil positioned within the conductive chassis in proximity to the edge antenna. The conductive coil is configured to receive the communication signal from the electrical feed and to generate a magnetic field corresponding to the communication signal that inductively drives the edge antenna to radiate a radio frequency signal corresponding to the communication signal.

20 Claims, 8 Drawing Sheets

COIL-DRIVEN NEAR FIELD COMMUNICATIONS ANTENNA

BACKGROUND

A foldable communication device (e.g., a foldable mobile computing device with multiple displays) can provide wireless communication functionality using antennas placed within the device, including Near Field Communication (NFC) functionality. Such devices can be used in different physical configurations (e.g., folded closed, unfolded into a laptop or tablet mode, folded wide open so that the "backs" of the displays are folded against each other).

SUMMARY

The described technology provides a communication device that includes a conductive chassis, an electrical feed positioned within the conductive chassis and configured to supply a communication signal, an edge antenna including at least a portion of the conductive chassis at an edge of the communication device, and a conductive coil positioned within the conductive chassis in proximity to the edge antenna. The conductive coil is configured to receive the communication signal from the electrical feed and to generate a magnetic field corresponding to the communication signal that inductively drives the edge antenna to radiate a radio frequency signal corresponding to the communication signal.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
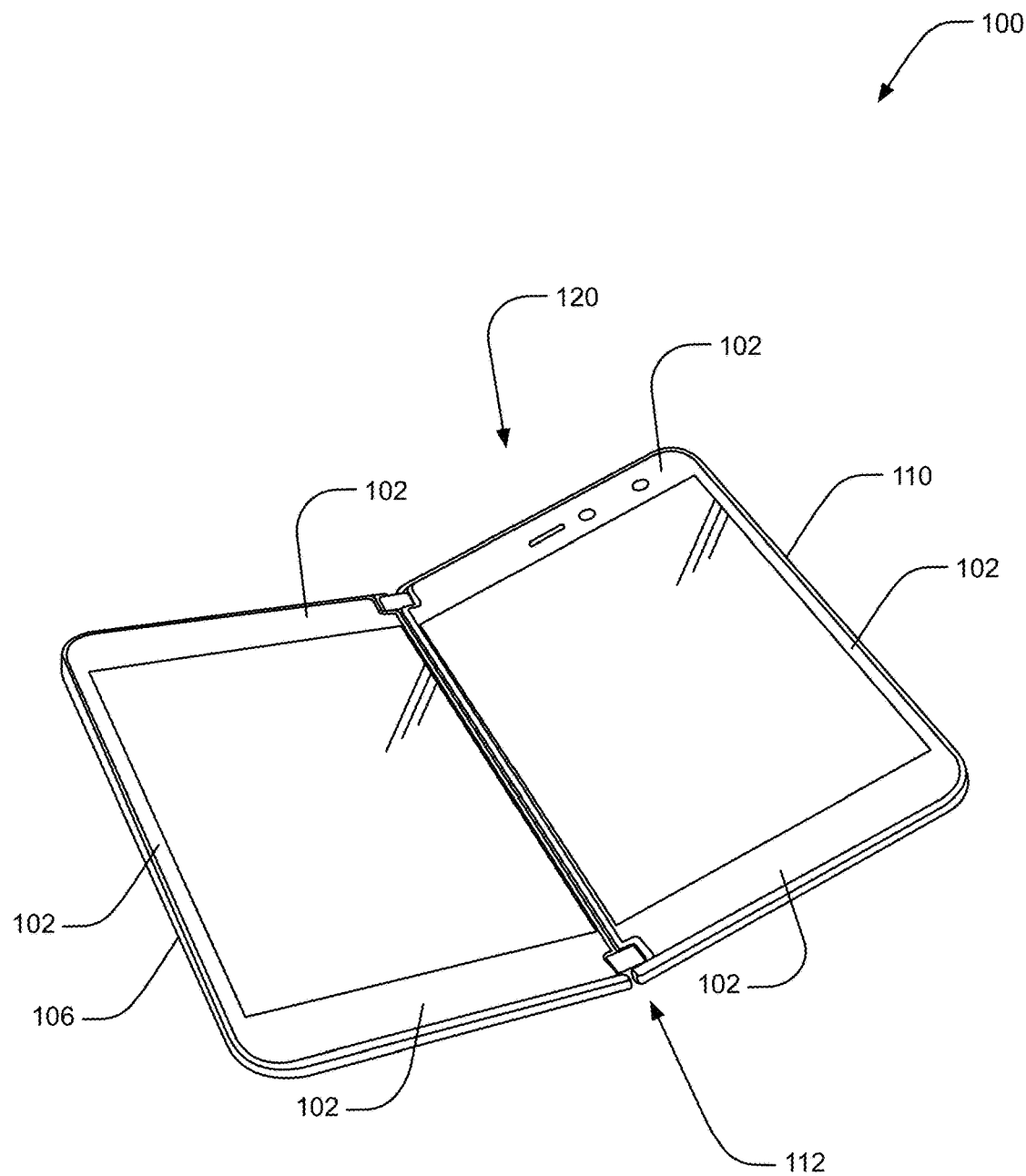
FIG. 1 illustrates an example foldable communication device.

Foldable communication devices present challenges in antenna design. For example, an example foldable communication device may include two device portions separated by a hinge, although additional device portions that move relative to each other may also be employed. Each portion can include a display to allow different physical configurations for operation. In a first example physical configuration, referred to as "folded closed" mode, the device portions are folded such that the displays are facing each other. In a second example physical configuration, referred to as "laptop" mode, the device portions are unfolded to such an extent that the displays are positioned similar to a laptop computer, with one display positioned upright like a laptop display and the other display positioned to face upward like a keyboard of a laptop computer. In a third example physical configuration, referred to as "tablet" mode, the device portions are unfolded to such an extent that the displays are positioned similar to a tablet computer, with both displays opened to substantially flat positions relative to each other. In a fourth example physical configuration, referred to as "folded open" or "phone" mode, the device portions are folded such that the backs of the device portions are facing each other (i.e., the displays facing away from each other). Other physical configurations may also be employed.

In addition to foldable communication devices, other physical configurable devices may also benefit from the described technology. For example, instead of folding, two device portions may slide relative to each other (e.g., sliding together into a phone mode or sliding apart into a tablet mode). The device portions in such a physically configurable device may be movably attached by hinges, sliders, sliding brackets, etc. to allow the relative movement of the device portions for changing the physical configuration of the device. Other physical configurations may also be employed.

In addition, industrial designers continue to push for exterior metal device chassis and for reductions in bezel (the region between the display edge and the device portion edge) sizes. Smaller bezels tend to reduce antenna size and, therefore, antenna performance.

Each of these physical positions can impact the wireless performance of the device. For example, folding the device portions can change the electrical size of the ground plane and, therefore, can change the impedance tuning to the various antennas on the communication device. In addition, the different physical configurations can present different coupling and tuning conditions experienced by the various antennas. For example, the folded closed and folded open configurations can introduce undesirable coupling and/or shielding that can negatively impact the performance of a Near Field Communications (NFC) antenna. It should be understood, however, that the described technology may be useful in enhancing antenna performance in devices that do not offer multiple physical configurations (e.g., that do not fold). An NFC antenna is described herein, although the performance of other antenna types may be improved using antenna configurations similar to those described herein.

Accordingly, in various implementations of the described technology, a combination of a small conductive coil inductively driving an edge antenna in a communication device can improve the transmission strength of a signal radiated by the edge antenna. In some implementations, the combination also improves antenna performance in the limited volume available at a device edge, particularly with a small bezel, such as by accommodating a small conductive coil rather than a large coil positioned in the middle of the device.

FIG. 1 illustrates an example foldable communication device 100. The foldable communication device 100 is contained within a conductive device chassis (e.g., an exterior metal case), such that a substantial area of the thin edges of the device portions is conductive/metal. The foldable communication device 100 is shown as unfolded almost into a flat tablet mode. The bezels 102 are shown at varying widths. The device portion 106 and the device portion 110 are movably attached by a hinge 112. An NFC antenna (not shown) is positioned along an edge of the example foldable communication device 100, such as at the top edge 120, although other edges may be employed for NFC signaling.

When the foldable communication device 100 is folded open or closed, the conductive elements (e.g., circuitry, conductive chassis edges) in the foldable communications device 100 can reduce the performance of the NFC antenna as they come into proximity with the NFC antenna, such as through coupling and/or shielding. The described technology provides one or more configurations to amplify the NFC signal from a small NFC coil, which drives an edge antenna (e.g., a ring or loop antenna formed in part from a conductive edge of the exterior metal case) at an edge of the foldable communication device 100. Accordingly, the signal radiated from the small NFC coil is amplified by the edge antenna.

By integrating the edge antenna into a conductive edge of the exterior metal case, the communication device benefits from the strength and rigidity of a metal chassis while avoiding most of the shielding and coupling issues associated with metal chassis in communication devices. Furthermore, the placement of an NFC antenna at the edge of the device provides a different, potentially more convenient or comfortable orientation for communicating with an NFC reader—rather than holding the flat surface of the device in proximity to the NFC reader, the user can hold the edge of the device in proximity to the NFC reader.

Figure 2:
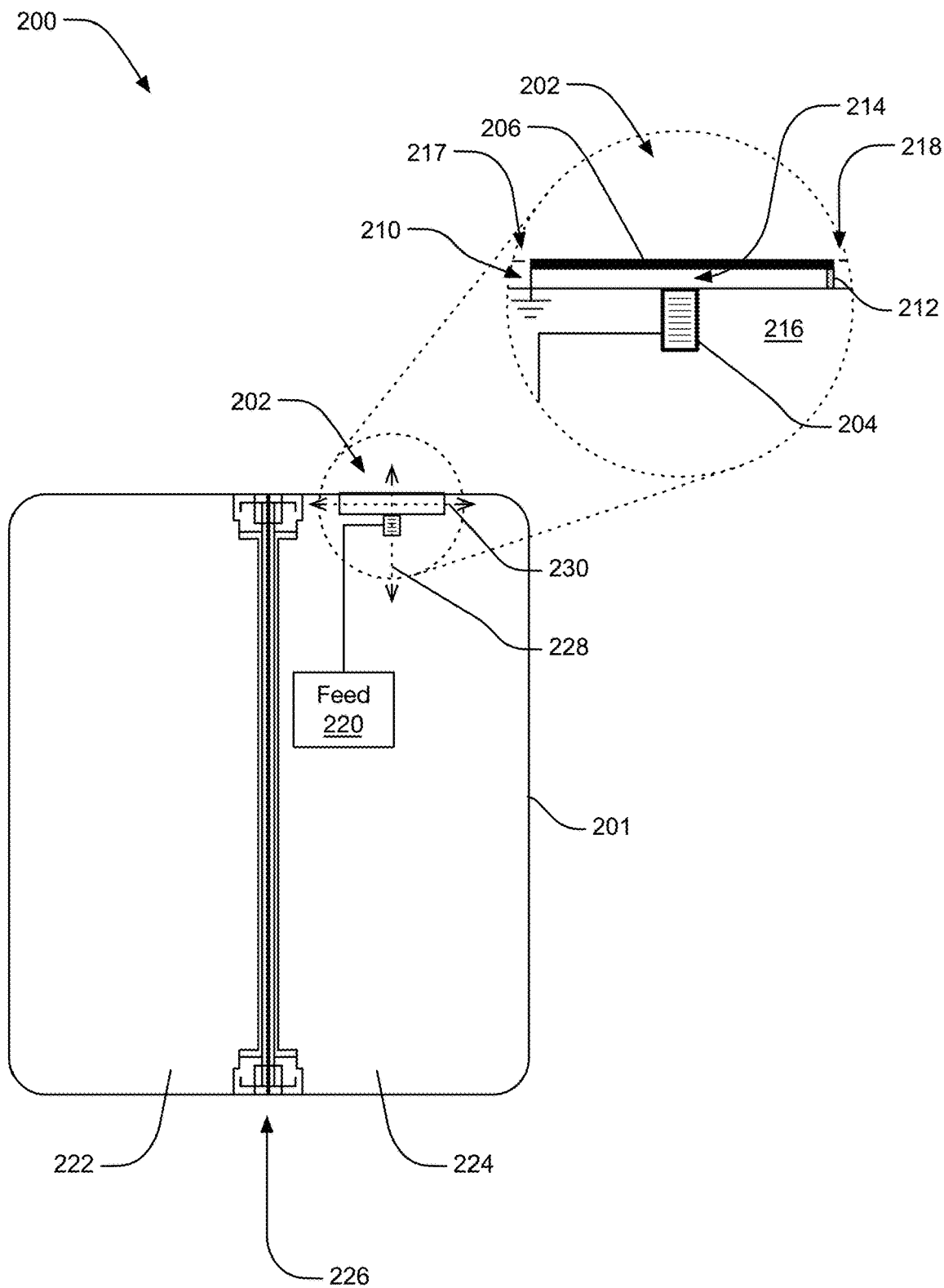
FIG. 2 illustrates elements of an example foldable communication device with an example coil-driven Near Field Communication (NFC) antenna.

FIG. 2 illustrates elements of an example foldable communication device 200 with an example coil-driven NFC antenna 202. The foldable communication device 200 is contained within a conductive device chassis 201 (e.g., an exterior metal case), such that substantial areas of the thin edges of the device portions are conductive/metal. The foldable communication device 200 is shown as unfolded into a flat tablet mode.

The coil-driven NFC antenna 202 is positioned along the top edge of the foldable communications device 200, although any edge may be employed. In the illustrated implementation, the coil-driven NFC antenna 202 includes a small NFC coil 204, an edge antenna 206 including an edge portion of the conductive device chassis 208, an electrical ground connection 210, and a tuning element 212 (e.g., a capacitor, a variable impedance element). In an implementation where the edge antenna is a ring or loop antenna, the edge antenna may include an aperture 214 (or slot) between the edge portion of the conductive device chassis and the device ground plane 216 (e.g., a motherboard) of the foldable communication device 200. It should be understood that, in some implementations, the tuning element may be mechanically, electrically, and/or programmatically adjusted to dynamically tune the edge antenna's impedance (e.g., to accommodate changing impedance resulting from changing physical configurations). Accordingly, a variable impedance element may be dynamically controlled to adjust the capacitance, inductance, and/or resistance of the edge antenna.

The foldable communication device 200 includes a device portion 222 and a device portion 224 that are both movably attached by a hinge 226 (a movable attachment), although other communication devices with different movable attachments or with a single device portions are contemplated. In at least one implementation, the edge antenna forms a section of an edge on the exterior metal case, although other implementations are contemplated. The edge antenna formed from the exterior metal case may be electrically separated from other antennas and other sections of the exterior metal case, such as by dielectric inserts or gaskets in regions 217 and 218.

Figure 3:
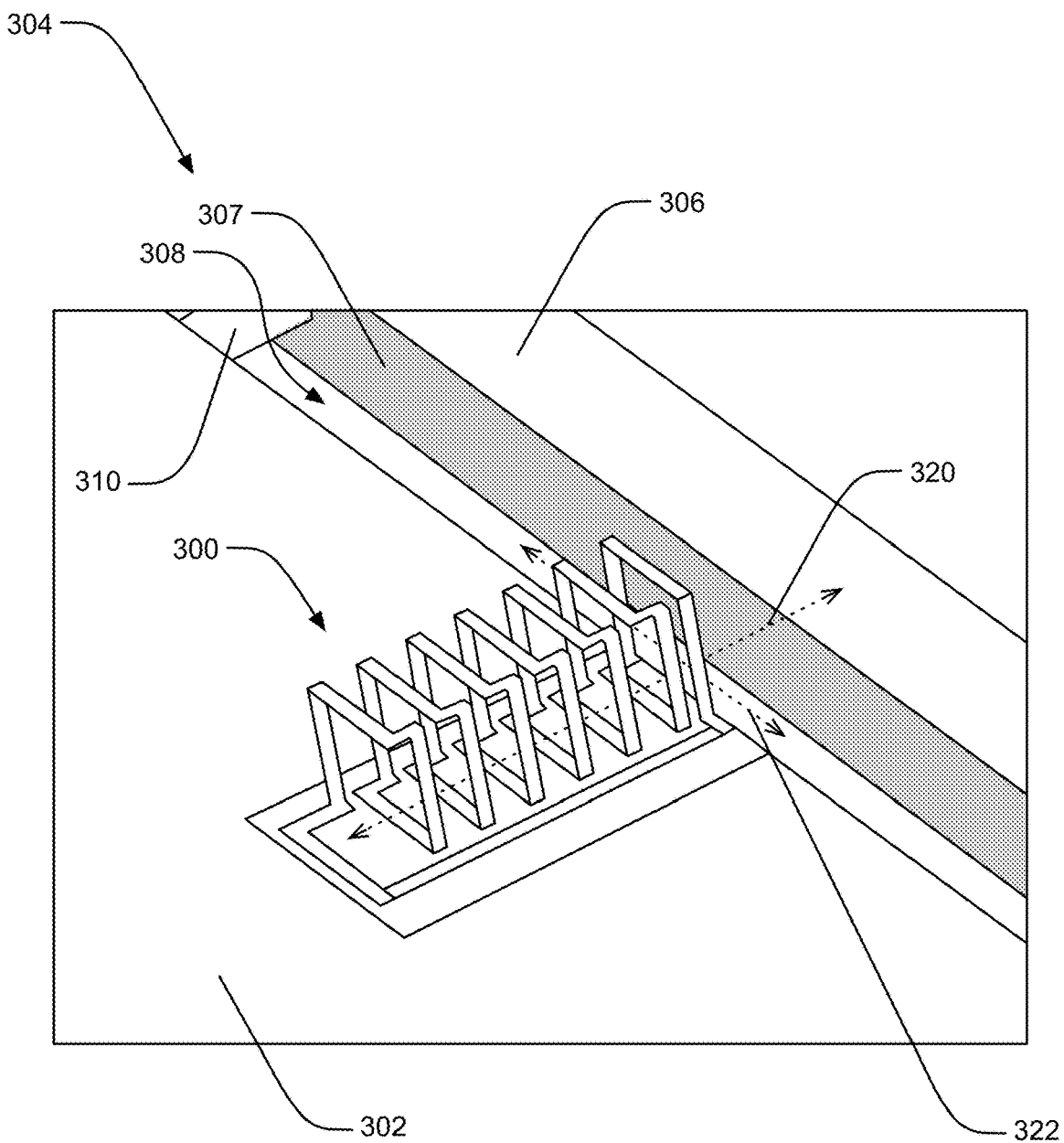
FIG. 3 illustrates a perspective view of an example conductive coil.

A coil axis 228 is shown in FIG. 2, representing an axis that extends along the coil (see also, FIG. 3). An edge axis 230 is also shown in FIG. 2, representing an axis that extends along the slot of the edge antenna 206. In one implementation, the foldable communication device 200 is configured such that the coil axis 228 and the edge axis 230 are substantially perpendicular to each other, although the inductive coupling may still be somewhat effective if the axes are at substantially non-perpendicular angles. In at least one implementation, the edge axis 230 extends along the longest dimension of the slot and is parallel to the edge of the communication device 200. In this manner, the electric field radiated by the edge antenna 206 can be maximized across the length of the edge antenna 206 (e.g., rather than having a non-parallel orientation which can result in a stronger electric field on one side of the edge antenna 206 and a weaker electric field on the other side).

A substantially perpendicular orientation of the axes can optimize the inductive driving of the edge antenna 206 by the coil 204 (e.g., an EM wave consists of perpendicular electric and magnetic fields). As such, the coil axis 228 and the edge axis 230 cross each other in such a way as to allow the coil 204 to inductively drive the edge antenna 206. Furthermore, the closer the coil 204 is to the edge antenna 206, the stronger the magnetic field (and inductive force) on the edge antenna 206.

A feed 220 electrically drives the small NFC coil 204 with an NFC signal, which inductively drives the edge antenna 206, although other signal formats may be employed in other implementations. In general, NFC operates in a frequency range centered on 13.56 MHz and offers a data transmission rate of up to 424 kbit/s within a distance of approximately 10 centimeters, although future signaling standards or different communication protocols may be generated in the described technology. In at least one implementation, the small NFC coil 204 and the edge antenna 206 radiate at substantially the same frequency band, although radiation at different frequency bands is possible.

As the foldable communications device 200 changes between modes (e.g., physical configurations), changes in the coupling, shielding, and/or electrical size of the ground plane can change the tuning of the edge antenna 206. Accordingly, the tuning element 212 is connected to the edge antenna 206 to maintain the tuning of the antenna. In one implementation, a variable impedance element may include a switched inductance network, a variable capacitor, and/or a variable resistor or switched resistance network, although other combinations of variable impedance elements may be employed. Variations in the impedance may be controlled mechanically, electrically, and/or by software (such as software executed by one or more processing units of a communication device, such as illustrated and described with regard to FIG. 7). In one implementation, the impedance is adjusted to tune the electrically coupled antennas based at least in part by the rotation of the hinge 226, based at least in part by feedback from sensors (e.g., gyros, accelerometers), etc.

FIG. 3 illustrates a perspective view of an example conductive coil 300. The conductive coil 300 is mounted on and near the edge of a circuit board 302, which includes a ground plane. The conductive coil 300 measures 5 mm×2 mm×2 mm in the illustrated implementation, although other sizes of conductive coils may be employed. The edge of the circuit board 302 is positioned near the edge of a conductive chassis that at least partially encloses the components of a communication device. An edge antenna 304 is positioned at the edge of the conductive chassis and includes an edge portion 306 of the conductive chassis, a slot 308 (e.g., an aperture), an electrical ground connection 310, and a tuning element (not shown) connecting the edge portion 306 to the ground plane. The shaded portion 307 of the edge portion 306 illustrates an interior wall of the edge portion 306, which forms one of the boundaries of the slot 308.

A coil axis 320 is shown in FIG. 3, representing an axis that extends through and along the length of the coil (see also, FIG. 3). An edge axis 322 is also shown in FIG. 3, representing an axis that extends along the slot of the edge antenna 304. In one implementation, a foldable communication device is configured such that the coil axis 320 and the edge axis 322 are substantially perpendicular to each other, although the inductive coupling may still be somewhat effective if the axes are at substantially non-perpendicular angles. The conductive coil 300 (and therefore the coil axis 320) are positioned such that the coil axis 320 crosses the dimensions of the slot 308 and the edge portion 306, as shown in FIG. 3. In this manner, eddy currents from conductive coil 300 generate a magnetic field that inductively drives a parasitic loop antenna in the form of the edge antenna 304, which includes a portion of the conductive chassis (e.g., an at least partially exterior metal enclosure). The radiation from the conductive coil 300 is amplified by the electrical size of the edge antenna 304.

Accordingly, in one implementation, an NFC signal is emitted at 13.56 MHz from the conductive coil 300 from the edge of the communication device, amplified by the (parasitic) edge antenna 304. The edge antenna 304 may be configured as a loop antenna with one end of the edge portion 306 being connected through the electrical ground connection 310 to the ground plane and the other end of the edge portion 306 is connected to electrical ground through a capacitor or other tuning element (not shown). Other signaling protocols may be employed.

Figure 4:
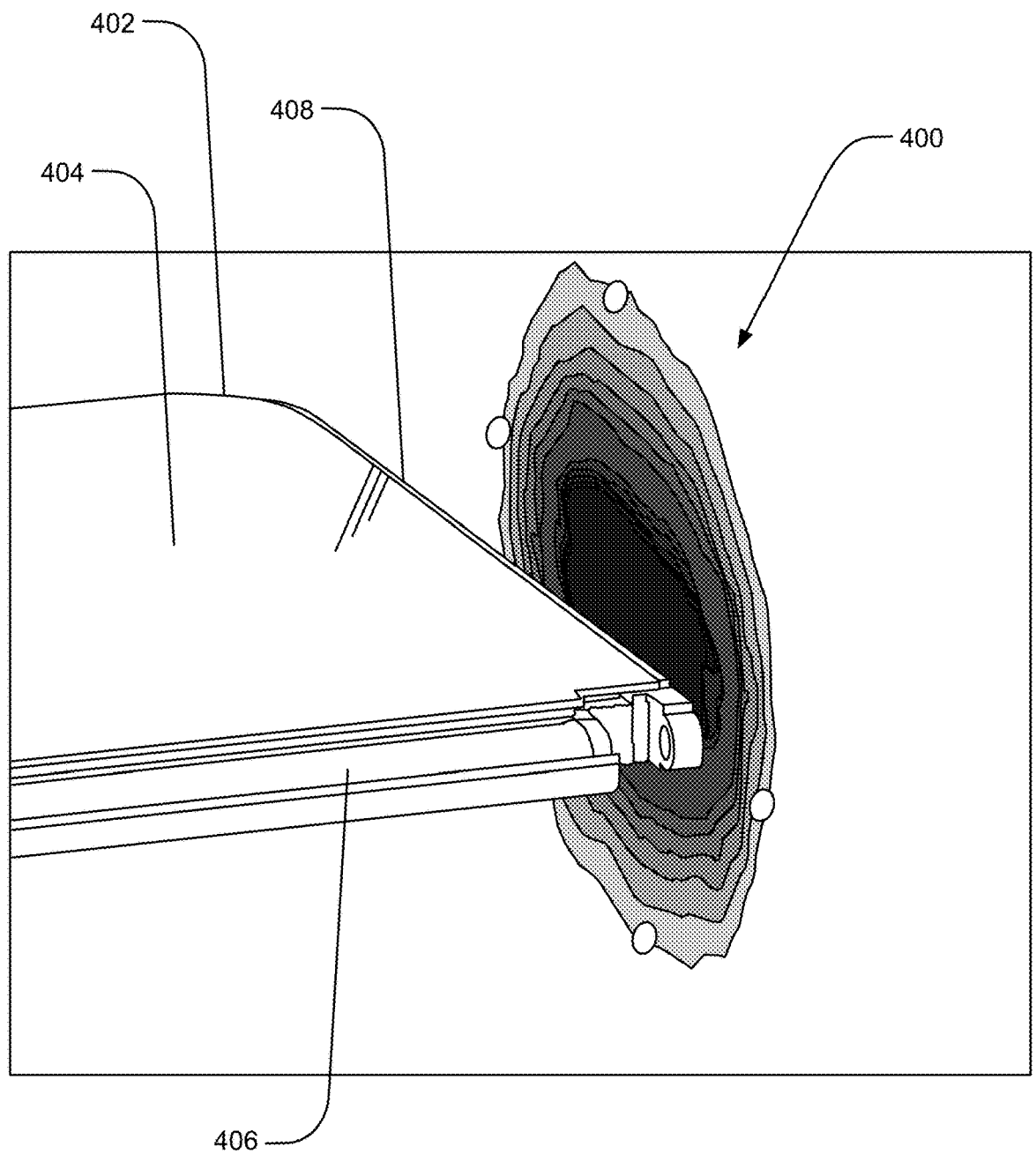
FIG. 4 illustrates a magnetic field distribution relative to an example foldable communication device.

FIG. 4 illustrates a magnetic field distribution 400 relative to an example foldable communication device 402. (The darker shading in the magnetic field distribution 400 represent a stronger magnetic field—see the legend in FIG. 5 for more details.) The magnetic field or H-field generated by the illustrated foldable communication device 402 has a width of approximately 50 mm and a height of approximately 40 mm from a conductive coil measuring 5 mm×2 mm×2 mm and a loop antenna measuring about 30 mm across the edge of the foldable communication device 402, although this dimension may be different in other implementations. The magnetic field extends approximately 40-80 mm away from the edge of the foldable communication device 402. The foldable communications device 402 (only half of which is shown) includes a display 404, a conductive chassis 406, and other components (not shown). A conductive coil (not shown) and an edge antenna (not shown) are positioned at an edge 408 of the communication device 402 and emit a boosted radiofrequency signal from the edge 408, relative to the strength of the radiofrequency signal radiated by the conductive coil alone.

Figure 5:
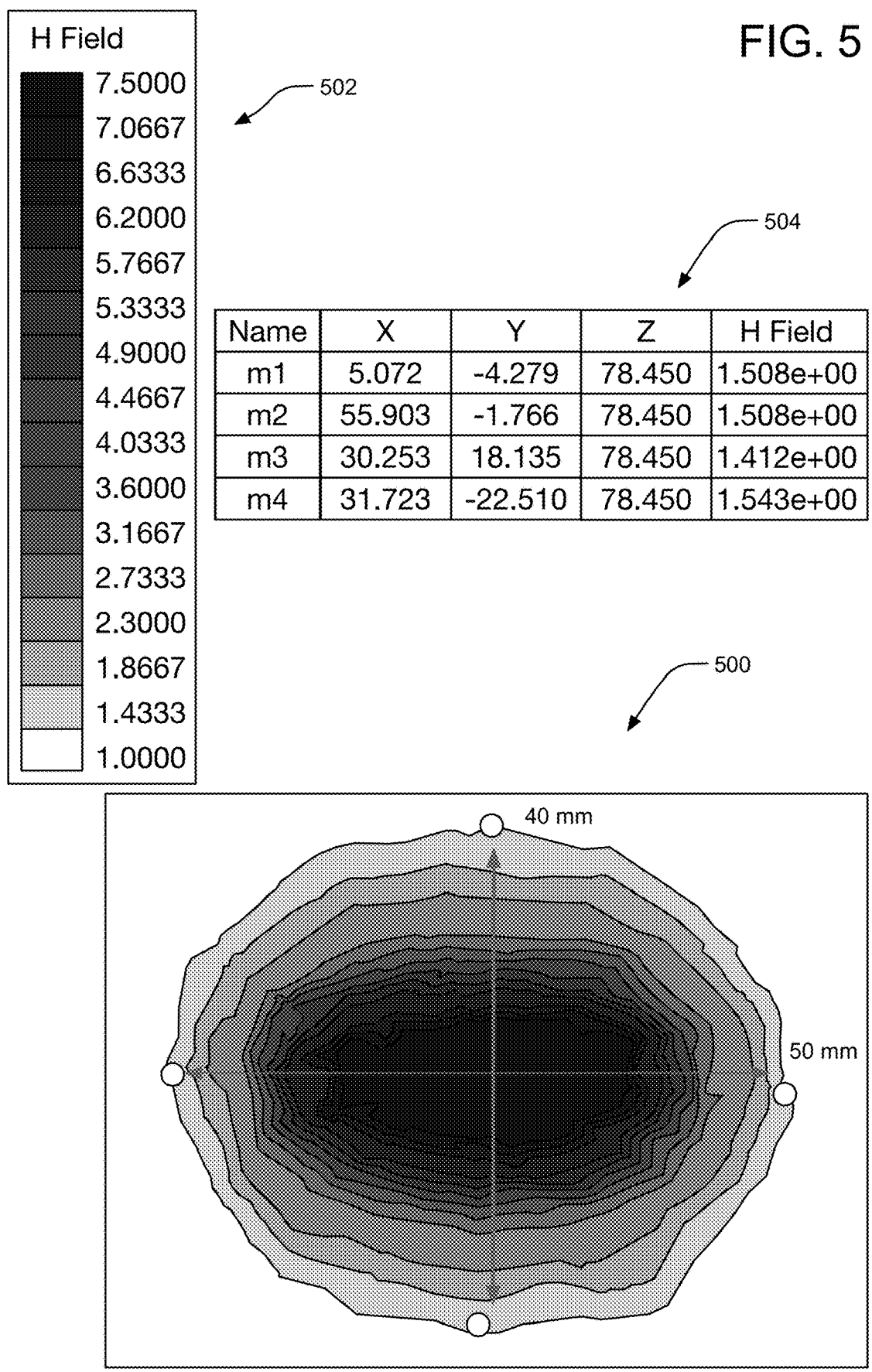
FIG. 5 illustrates a magnetic field distribution with dimensions and other parameters.

FIG. 5 illustrates an example magnetic field distribution 500 with dimensions and other parameters. A legend 502 illustrates the gradations of magnetic field strength in the magnetic field distribution 500 in amps per meter. The data table 504 provides magnetic field strengths at four different point coordinates (m1, m2, m3, and m4) in an example design of conductive coil-parasitic edge antenna combinations.

Figure 6:
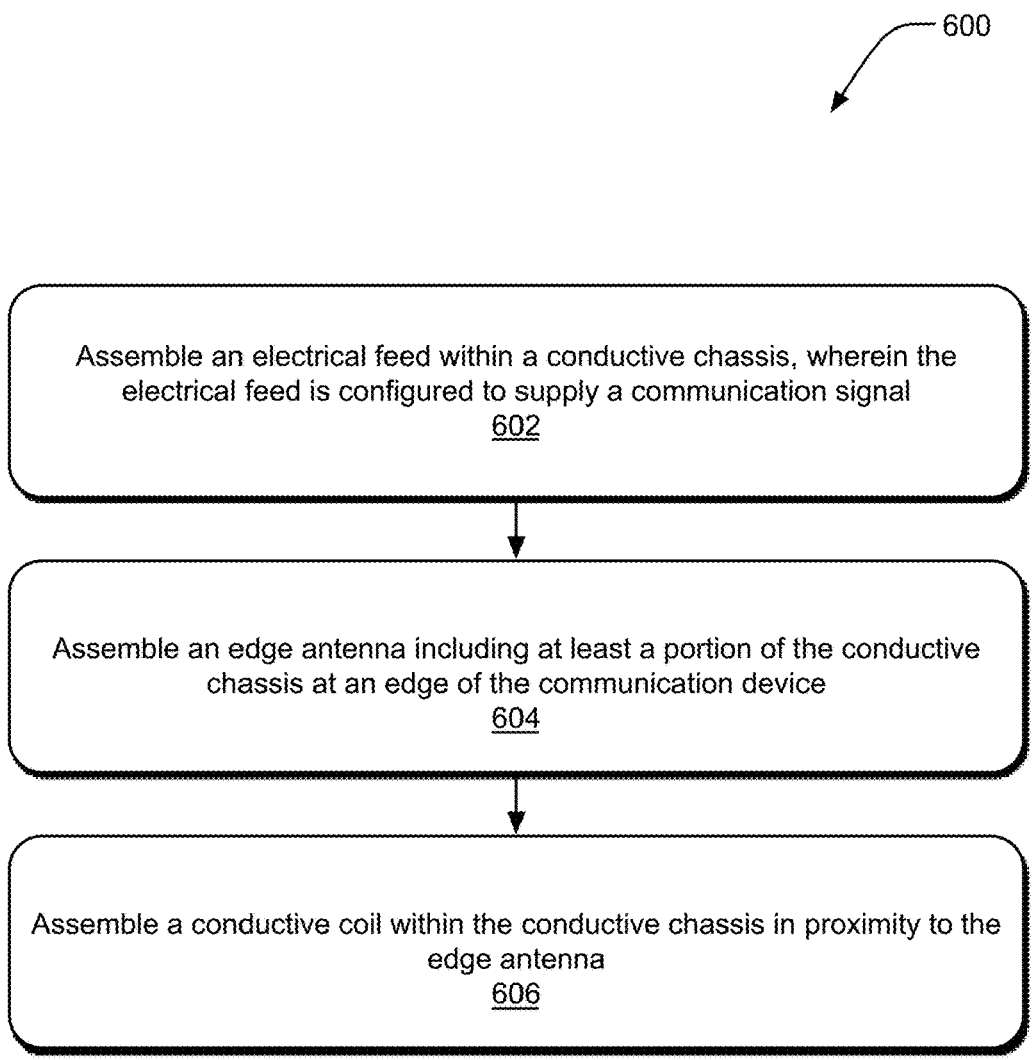
FIG. 6 illustrates example operations for building an example foldable communication device with an example coil-driven parasitic edge antenna.

FIG. 6 illustrates example operations 600 for building an example foldable communication device with an example coil-driven parasitic edge antenna. An assembly operation 602 assembles an electrical feed within a conductive chassis, wherein the electrical feed is configured to supply a communication signal. For example, the electrical feed may be mounted on a circuit board and connected to a transceiver or other signal source.

Another assembly operation 604 assembles an edge antenna that includes at least a portion of the conductive chassis at an edge of the communication device. In one implementation, the edge antenna is electrically connected to a ground plane of the circuit board via an electrical ground connection and by a tuning element. The edge antenna includes a portion of the conductive chassis at the edge of the communication device and forms a slot or aperture between the portion of the conductive chassis and the ground plane. Other configurations, however, may be employed.

Yet another assembly operation 606 assembles a conductive coil within the conductive chassis in proximity to the edge antenna. The conductive coil is assembled to receive the communication signal from the electrical feed. The conductive coil is also configured to generate a magnetic field corresponding to the communication signal that inductively drives the edge antenna to radiate a radio frequency signal corresponding to the communication signal.

Figure 7:
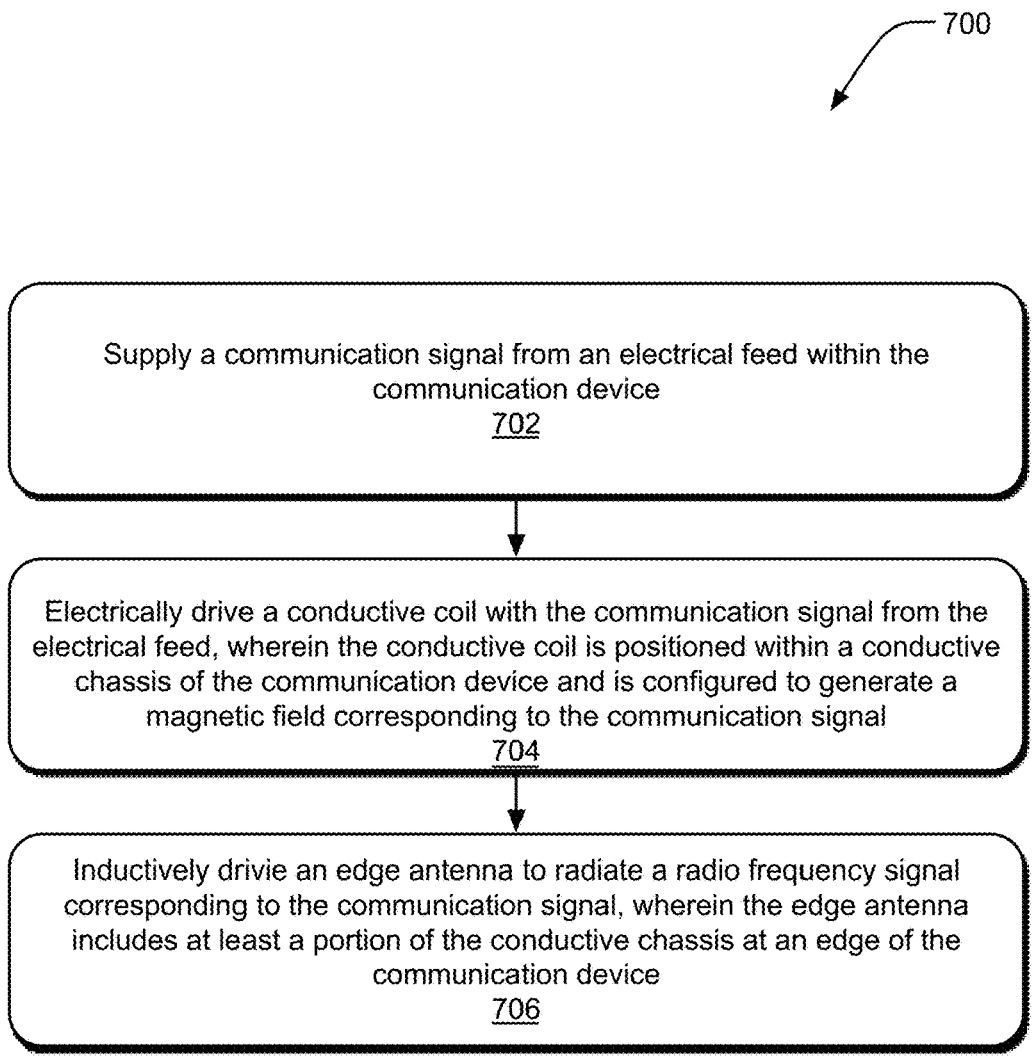
FIG. 7 illustrates example operations for using an example foldable communication device with an example coil-driven parasitic edge antenna.

FIG. 7 illustrates example operations 700 for using an example foldable communication device with an example coil-driven edge antenna. A signaling operation 702 supplies a communication signal from an electrical feed within the communication device. A driving operation 704 electrically drives a conductive coil with the communication signal from the electrical feed. The conductive coil is positioned within a conductive chassis of the communication device and is configured to generate a magnetic field corresponding to the communication signal. Another driving operation 706 inductively drives an edge antenna to radiate a radio frequency signal corresponding to the communication signal, wherein the edge antenna includes at least a portion of the conductive chassis at an edge of the communication device.

As described above, additional operations may be employed, including without limitation adjusting the impedance of each capacitively coupled antenna to accommodate changes in the physical configuration of the communication device and detecting a change in the physical configuration of the communication device to trigger an impedance adjustment. Such detection may involve gyros, accelerometers, rotational sensors in a hinge, and other sensor or mechanical-based detecting elements. In yet another implementation, such detection may be detected based on the software-detected use contexts of the communication device or combinations of one or more of the above techniques.

Figure 8:
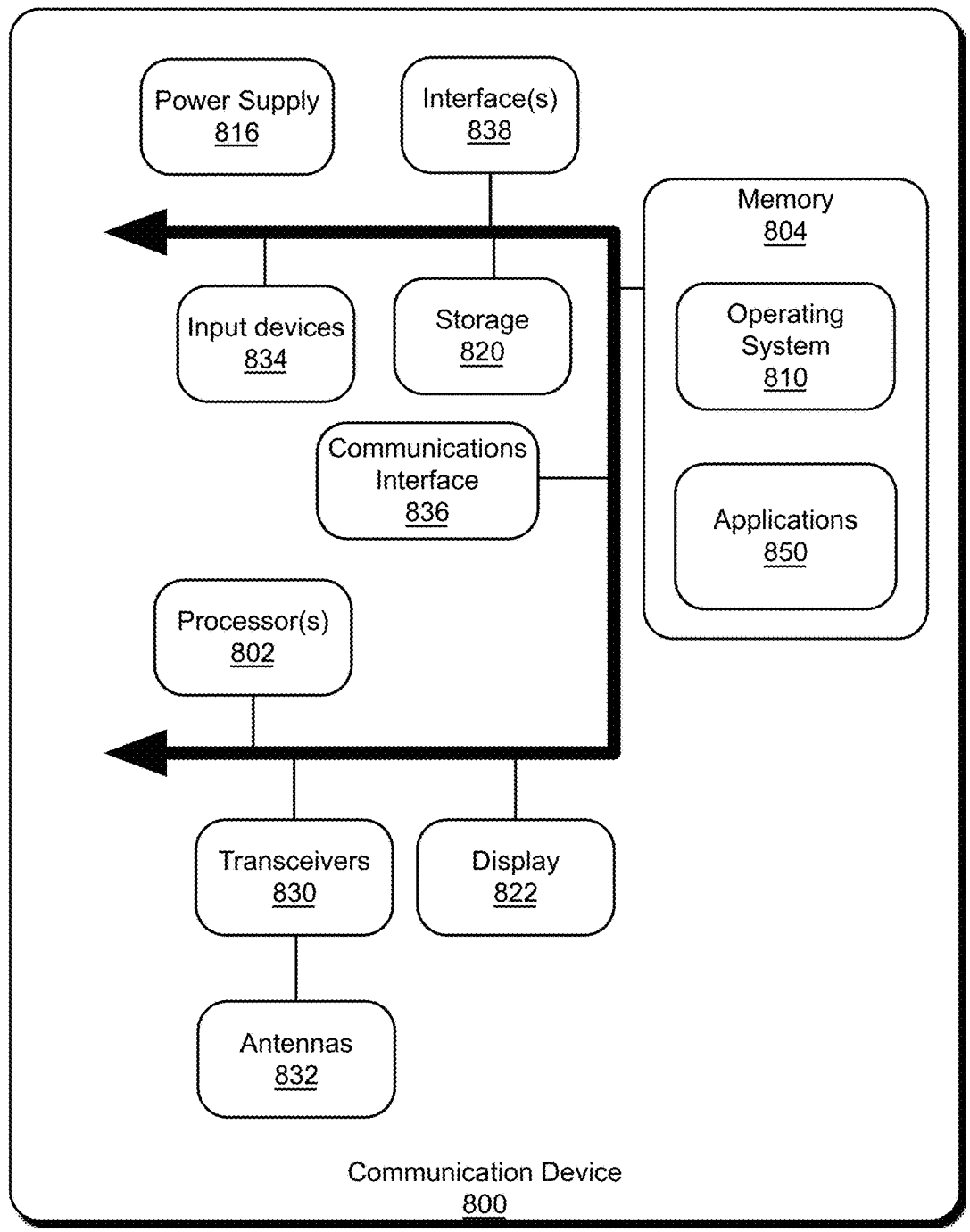
FIG. 8 illustrates exampled hardware and software that can be useful in implementing the described technology.

FIG. 8 illustrates an example communication device 800 for implementing the features and operations of the described technology. The communication device 800 may embody a remote control device or a physical controlled device and is an example network-connected and/or network-capable device and may be a client device, such as a laptop, mobile device, desktop, tablet; a server/cloud device; an internet-of-things device; an electronic accessory; or another electronic device. The communication device 800 includes one or more processor(s) 802 and a memory 804. The memory 804 generally includes both volatile memory (e.g., RAM) and nonvolatile memory (e.g., flash memory). An operating system 810 resides in the memory 804 and is executed by the processor(s) 802.

In an example communication device 800, as shown in FIG. 8, one or more modules or segments, such as applications 850, a tuning application, and other services, workloads, and software/firmware modules, are loaded into the operating system 810 on the memory 804 and/or storage 820 and executed by processor(s) 802. The storage 820 may include one or more tangible storage media devices and may store physical configurations, sensor data, and corresponding tuning parameters, and other data and be local to the communication device 800 or may be remote and communicatively connected to the communication device 800.

The communication device 800 includes a power supply 816, which is powered by one or more batteries or other power sources and which provides power to other components of the communication device 800. The power supply 816 may also be connected to an external power source that overrides or recharges the built-in batteries or other power sources.

The communication device 800 may include one or more communication transceivers 830, which may be connected to one or more antenna(s) 832 to provide network connectivity (e.g., mobile phone network, Wi-Fi®, Bluetooth®) to one or more other servers and/or client devices (e.g., mobile devices, desktop computers, or laptop computers). The communication device 800 may further include a network adapter 836, which is a type of computing device. The communication device 800 may use the adapter and any other types of computing devices for establishing connections over a wide-area network (WAN) or local-area network (LAN). It should be appreciated that the network connections shown are exemplary and that other computing devices and means for establishing a communications link between the communication device 800 and other devices may be used.

The communication device 800 may include one or more input devices 834 such that a user may enter commands and information (e.g., a keyboard or mouse). These and other input devices may be coupled to the server by one or more interfaces 838, such as a serial port interface, parallel port, or universal serial bus (USB). The communication device 800 may further include a display 822, such as a touch screen display.

The communication device 800 may include a variety of tangible processor-readable storage media and intangible processor-readable communication signals. Tangible processor-readable storage can be embodied by any available media that can be accessed by the communication device 800 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the communication device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote control device and/or a physical controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

An example communication device includes a conductive chassis, an electrical feed positioned within the conductive chassis and configured to supply a communication signal, an edge antenna including at least a portion of the conductive chassis at an edge of the communication device, and a conductive coil positioned within the conductive chassis in proximity to the edge antenna. The conductive coil is configured to receive the communication signal from the electrical feed and to generate a magnetic field corresponding to the communication signal that inductively drives the edge antenna to radiate a radio frequency signal corresponding to the communication signal.

Another example communication device of any preceding device is provided, wherein the communication signal is a Near Field Communication (NFC) signal.

Another example communication device of any preceding device is provided, wherein the edge antenna includes at least a portion of the conductive chassis on an exterior surface of the communication device.

Another example communication device of any preceding device is provided 1, wherein the conductive coil extends along a coil axis, the edge extends along an edge axis, and the coil axis and the edge axis are substantially perpendicular to each other.

Another example communication device of any preceding device is provided, wherein the conductive coil extends along a coil axis that extends through the conductive coil and crosses the edge antenna.

Another example communication device of any preceding device is provided, wherein the edge antenna includes a slot that extends parallel to the edge of the communication device.

Another example communication device of any preceding device is provided, wherein the edge antenna includes a loop antenna.

Another example communication device of any preceding device is provided, wherein the edge antenna includes a tuning element connecting the at least a portion of the conductive chassis to a ground plane of the communication device.

An example method of generating a radio frequency signal from a communication device includes supplying a communication signal from an electrical feed within the communication device, electrically driving a conductive coil with the communication signal from the electrical feed, wherein the conductive coil is positioned within a conductive chassis of the communication device and is configured to generate a magnetic field corresponding to the communication signal, and inductively driving an edge antenna to radiate the radio frequency signal corresponding to the communication signal, wherein the edge antenna includes at least a portion of the conductive chassis at an edge of the communication device.

An example method of any preceding method is provided, wherein the communication signal is a Near Field Communication (NFC) signal.

An example method of any preceding method is provided, wherein the edge antenna includes at least a portion of the conductive chassis on an exterior surface of the communication device.

An example method of any preceding method is provided, wherein the conductive coil extends along a coil axis, the edge extends along an edge axis, and the coil axis and the edge axis are substantially perpendicular to each other.

An example method of any preceding method is provided, wherein the conductive coil extends along a coil axis that extends through the conductive coil and crosses the edge antenna.

An example method of any preceding method is provided 9, wherein the edge antenna includes a loop antenna.

An example method of manufacturing a communication device includes assembling an electrical feed within a conductive chassis, wherein the electrical feed is configured to supply a communication signal, assembling an edge antenna including at least a portion of the conductive chassis at an edge of the communication device, and assembling a conductive coil within the conductive chassis in proximity to the edge antenna. The conductive coil is configured to receive the communication signal from the electrical feed and to generate a magnetic field corresponding to the communication signal that inductively drives the edge antenna to radiate a radio frequency signal corresponding to the communication signal.

Another example method of any preceding method is provided, wherein the communication signal is a Near Field Communication (NFC) signal.

Another example method of any preceding method is provided, wherein the edge antenna includes at least a portion of the conductive chassis on an exterior surface of the communication device.

Another example method of any preceding method is provided, wherein the conductive coil extends along a coil axis, the edge extends along an edge axis, and the coil axis and the edge axis are substantially perpendicular to each other.

Another example method of any preceding method is provided, wherein the conductive coil extends along a coil axis that extends through the conductive coil and crosses the edge antenna.

Another example method of any preceding method is provided, wherein the edge antenna includes a loop antenna.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A communication device comprising:
   a conductive chassis;
   an electrical feed positioned within the conductive chassis and configured to supply a communication signal;
   an edge antenna including at least a portion of the conductive chassis at an edge of the communication device; and a conductive coil positioned within the conductive chassis in proximity to the edge antenna, wherein the conductive coil is configured to receive the communication signal from the electrical feed and to generate a magnetic field corresponding to the communication signal that inductively drives the edge antenna to radiate a radio frequency signal corresponding to the communication signal.

2. The communication device of claim 1, wherein the communication signal is a Near Field Communication (NFC) signal.

3. The communication device of claim 1, wherein the edge antenna includes at least a portion of the conductive chassis on an exterior surface of the communication device.

4. The communication device of claim 1, wherein the conductive coil extends along a coil axis, the edge extends along an edge axis, and the coil axis and the edge axis are substantially perpendicular to each other.

5. The communication device of claim 1, wherein the conductive coil extends along a coil axis that extends through the conductive coil and crosses the edge antenna.

6. The communication device of claim 1, wherein the edge antenna includes a slot that extends parallel to the edge of the communication device.

7. The communication device of claim 1, wherein the edge antenna includes a loop antenna.

8. The communication device of claim 1, wherein the edge antenna includes a tuning element connecting the at least a portion of the conductive chassis to a ground plane of the communication device.

9. A method of generating a radio frequency signal from a communication device, the method comprising:
- supplying a communication signal from an electrical feed within the communication device;
- electrically driving a conductive coil with the communication signal from the electrical feed, wherein the conductive coil is positioned within a conductive chassis of the communication device and is configured to generate a magnetic field corresponding to the communication signal; and
- inductively driving an edge antenna to radiate the radio frequency signal corresponding to the communication signal, wherein the edge antenna includes at least a portion of the conductive chassis at an edge of the communication device.

10. The method of claim 9, wherein the communication signal is a Near Field Communication (NFC) signal.

11. The method of claim 9, wherein the edge antenna includes at least a portion of the conductive chassis on an exterior surface of the communication device.

12. The method of claim 9, wherein the conductive coil extends along a coil axis, the edge extends along an edge axis, and the coil axis and the edge axis are substantially perpendicular to each other.

13. The method of claim 9, wherein the conductive coil extends along a coil axis that extends through the conductive coil and crosses the edge antenna.

14. The method of claim 9, wherein the edge antenna includes a loop antenna.

15. A method of manufacturing a communication device, the method comprising:
- assembling an electrical feed within a conductive chassis, wherein the electrical feed is configured to supply a communication signal;
- assembling an edge antenna including at least a portion of the conductive chassis at an edge of the communication device; and
- assembling a conductive coil within the conductive chassis in proximity to the edge antenna, wherein the conductive coil is configured to receive the communication signal from the electrical feed and to generate a magnetic field corresponding to the communication signal that inductively drives the edge antenna to radiate a radio frequency signal corresponding to the communication signal.

16. The method of claim 15, wherein the communication signal is a Near Field Communication (NFC) signal.

17. The method of claim 15, wherein the edge antenna includes at least a portion of the conductive chassis on an exterior surface of the communication device.

18. The method of claim 15, wherein the conductive coil extends along a coil axis, the edge extends along an edge axis, and the coil axis and the edge axis are substantially perpendicular to each other.

19. The method of claim 15, wherein the conductive coil extends along a coil axis that extends through the conductive coil and crosses the edge antenna.

20. The method of claim 15, wherein the edge antenna includes a loop antenna.

* * * * *